United States Patent
Wang et al.

(10) Patent No.: US 12,511,386 B2
(45) Date of Patent: *Dec. 30, 2025

(54) MALWARE PROPAGATION FORECASTING

(71) Applicant: BRITISH TELECOMMUNICATIONS PUBLIC LIMITED COMPANY, London (GB)

(72) Inventors: Xiao-Si Wang, London (GB); Jessica Welding, London (GB)

(73) Assignee: British Telecommunications Public Limited Company, London (GB)

( * ) Notice: Subject to any disclaimer, the term of this patent is extended or adjusted under 35 U.S.C. 154(b) by 145 days.

This patent is subject to a terminal disclaimer.

(21) Appl. No.: 17/904,453

(22) PCT Filed: Feb. 16, 2021

(86) PCT No.: PCT/EP2021/053764
§ 371 (c)(1),
(2) Date: Aug. 17, 2022

(87) PCT Pub. No.: WO2021/165257
PCT Pub. Date: Aug. 26, 2021

(65) Prior Publication Data
US 2023/0123046 A1  Apr. 20, 2023

(30) Foreign Application Priority Data
Feb. 17, 2020 (EP) ..................... 20157627

(51) Int. Cl.
*G06F 21/56* (2013.01)
(52) U.S. Cl.
CPC ...... *G06F 21/566* (2013.01); *G06F 2221/034* (2013.01)
(58) Field of Classification Search
None
See application file for complete search history.

(56) References Cited

U.S. PATENT DOCUMENTS 8,667,581 B2 * 3/2014 Steeves ............... H04L 63/1441
726/22
8,904,542 B2 12/2014 Amnon et al.
(Continued)

FOREIGN PATENT DOCUMENTS

CA 2787933 8/2011
CN 1841397 A 10/2006
(Continued)

OTHER PUBLICATIONS

Combined Search and Examination Report under Sections 17 and 18(3) for Great Britain Application No. 2002121.8, mailed Aug. 4, 2020, 6 pages.
(Continued)

*Primary Examiner* — Simon P Kanaan
(74) *Attorney, Agent, or Firm* — EIP US LLP (57) ABSTRACT

A malware protection method to protect at least a subset of a set of computer systems from a malware includes accessing a model of the set of computer systems, the model identifying interacting pairs of the computer systems in the set based on interactions corresponding to previous communication occurring between the computer systems in the pair; simulating, over a plurality of time periods, a propagation of the malware originating from a predetermined source computer system in the model, the simulation being based on a number of interactions per time period between each interacting pair of computer systems in the set, and a rate of transmission of the malware per interaction; and, responsive to the simulating, identifying one or more computer systems or interacting pairs of computer systems to deploy a malware protection measure thereto so as to inhibit a propagation of the malware through the set of computer systems.

12 Claims, 4 Drawing Sheets

(56) References Cited

U.S. PATENT DOCUMENTS

| | | |
|---|---|---|
| 9,060,018 B1 | 6/2015 | Yu et al. |
| 9,679,140 B2 | 6/2017 | Smith et al. |
| 9,749,347 B2 | 8/2017 | Pinney Wood et al. |
| 10,084,806 B2 | 9/2018 | Ward et al. |
| 10,298,598 B1 | 5/2019 | Mcclintock |
| 10,742,475 B2 | 8/2020 | Lai et al. |
| 10,862,917 B2 | 12/2020 | Sugarbaker |
| 10,963,802 B1 | 3/2021 | Gardner et al. |
| 11,190,534 B1 | 11/2021 | Shah et al. |
| 11,245,716 B2 | 2/2022 | Roelofs |
| 11,283,828 B2 | 3/2022 | Riccetti et al. |
| 11,349,857 B1 | 5/2022 | Shah et al. |
| 11,397,258 B2 | 7/2022 | Zeng et al. |
| 11,423,143 B1 | 8/2022 | Lin |
| 11,470,103 B2 | 10/2022 | Dean et al. |
| 11,470,109 B2 | 10/2022 | Wang et al. |
| 11,500,058 B2 | 11/2022 | Hu et al. |
| 11,704,431 B2 | 7/2023 | Kraus et al. |
| 11,727,109 B2 | 8/2023 | Speakman et al. |
| 11,829,484 B2 | 11/2023 | Lipkis et al. |
| 11,863,584 B2 | 1/2024 | Togari et al. |
| 12,046,040 B2 | 7/2024 | Wang et al. |
| 12,126,636 B2 | 10/2024 | Dean et al. |
| 2002/0162015 A1 | 10/2002 | Tang |
| 2003/0105973 A1 | 6/2003 | Liang et al. |
| 2005/0050338 A1 | 3/2005 | Liang et al. |
| 2005/0248457 A1 | 11/2005 | Himberger et al. |
| 2007/0220606 A1 | 9/2007 | Omote et al. |
| 2008/0005124 A1 | 1/2008 | Jung et al. |
| 2009/0133123 A1 | 5/2009 | Radha et al. |
| 2010/0199349 A1 | 8/2010 | Ellis |
| 2011/0078797 A1 | 3/2011 | Beachem |
| 2013/0007741 A1 | 1/2013 | Britsch et al. |
| 2013/0305357 A1 | 11/2013 | Ayyagari |
| 2013/0340080 A1 | 12/2013 | Gostev et al. |
| 2014/0237599 A1 | 8/2014 | Gertner |
| 2015/0026027 A1 | 1/2015 | Priess |
| 2015/0341379 A1 | 11/2015 | Lefebvre |
| 2018/0004948 A1 | 1/2018 | Martin et al. |
| 2018/0144139 A1 | 5/2018 | Cheng |
| 2018/0375889 A1 | 12/2018 | Dickenson |
| 2019/0028496 A1 | 1/2019 | Fenoglio et al. |
| 2019/0052659 A1 | 2/2019 | Weingarten et al. |
| 2019/0266297 A1 | 8/2019 | Krause |
| 2020/0021607 A1 | 1/2020 | Muddu |
| 2020/0064444 A1 | 2/2020 | Regani et al. |
| 2021/0021636 A1 | 1/2021 | Sbandi |
| 2021/0144168 A1 | 5/2021 | Vester et al. |
| 2021/0160281 A1 | 5/2021 | Hallaji |
| 2021/0168173 A1 | 6/2021 | Compton |
| 2022/0086179 A1 | 3/2022 | Levin et al. |
| 2022/0116411 A1* | 4/2022 | Melicher ................ G06F 21/53 |
| 2023/0161874 A1* | 5/2023 | Wang ................ H04L 63/1433 726/22 |
| 2023/0376598 A1* | 11/2023 | Wang .................... G06F 21/566 |
| 2023/0379360 A1 | 11/2023 | Hallaji |
| 2024/0310851 A1 | 9/2024 | Ebrahimi Afrouzi et al. |

FOREIGN PATENT DOCUMENTS

| | | |
|---|---|---|
| CN | 104166708 A | 11/2014 |
| CN | 105359484 A | 2/2016 |
| CN | 106027513 A | 10/2016 |
| CN | 106599691 A | 4/2017 |
| CN | 106656571 A | 5/2017 |
| CN | 106936855 A | 7/2017 |
| CN | 109190375 A | 1/2019 |
| EP | 1835429 A2 | 9/2007 |
| EP | 1990973 A2 | 11/2008 |
| EP | 1995929 A2 | 11/2008 |
| EP | 1990973 B1 | 8/2015 |
| EP | 1410565 | 11/2017 |
| GB | 2574093 A | 11/2019 |
| GB | 2574093 A1 | 10/2020 |
| KR | 101825911 B1 | 2/2018 |
| RU | 91203 U1 | 1/2010 |
| WO | 2006132987 A1 | 12/2006 |
| WO | 2008005376 A2 | 1/2008 |
| WO | WO-2019185404 A1 | 10/2019 |
| WO | WO-2019185405 A1 | 10/2019 |
| WO | 2020065737 B | 4/2020 |
| WO | 2021001237 A1 | 1/2021 |
| WO | 2021165256 A1 | 8/2021 |
| WO | 2021165257 A1 | 8/2021 |
| WO | 2021198295 A1 | 10/2021 |

OTHER PUBLICATIONS

Examination Report under 18(3) for Great Britain Application No. 2002122.6, mailed Nov. 30, 2021, 3 pages.
Extended European Search Report for Application No. 20157627.9, mailed on Jun. 12, 2020, 9 pages.
International Search Report and Written Opinion for Application No. PCT/EP2021/053763 mailed on Mar. 9, 2021, 13 pages.
International Search Report and Written Opinion for Application No. PCT/EP2021/053764 mailed on Mar. 9, 2021, 13 pages.
Jia Z., et al., "Research on Computer Virus Source Modeling with Immune Characteristics," 2017 29th Chinese Control and Decision Conference (CCDC), May 28, 2017, pp. 4616-4619.
Liu W., "Web Malware Spread Modelling and Optimal Control Strategies," Scientific Reports, Feb. 10, 2017, vol. 7(42308), 19 pages.
Search Report under Section 17(5) for Great Britain Application No. 2002122.6, mailed on Aug. 4, 2020, 4 pages.
Wang C., et al., "On Computer Viral Infection and the Effect of Immunization," Proceedings 16th Annual Computer Security Applications Conference (ACSAC'00), Dec. 11-15, 2000, pp. 246-256.
Combined Search and Examination Report received for Great Britain Patent Application No. 1804775.3, mailed on Sep. 28, 2018, 6 pages.
Combined Search and Examination Report received for Great Britain Patent Application No. 1804776.1, mailed on Sep. 26, 2018, 6 pages.
Combined Search and Examination Report received for Great Britain Patent Application No. 1804777.9, mailed on Sep. 26, 2018, 7 pages.
Combined Search and Examination Report received for Great Britain Patent Application No. 1903788.6, mailed on Sep. 20, 2019, 6 pages.
Combined Search and Examination Report received for Great Britain Patent Application No. 2004994.6, mailed on Jul. 13, 2020, 5 pages.
Combined Search and Examination Report received for Great Britain Patent Application No. 2020915.1, mailed on May 11, 2021, 5 pages.
Combined Search and Examination Report received for Great Britain Patent Application No. 2203355.9, mailed on Oct. 10, 2022, 12 pages.
Combined Search and Examination Report received for Great Britain Patent Application No. 2203361.7, mailed on Oct. 17, 2022, 12 pages.
Combined Search and Examination Report received for Great Britain Patent Application No. 2203366.6, mailed on Oct. 21, 2022, 12 pages.
Combined Search and Examination Report received for Great Britain Patent Application No. 2203371.6, mailed on Nov. 3, 2022, 12 pages.
Extended European Search Report received for European Patent Application No. 18163821.4, mailed on Jul. 23, 2018, 9 pages.
Extended European Search Report received for European Patent Application No. 18163823.0, mailed on Jun. 26, 2018, 7 pages.
Extended European Search Report received for European Patent Application No. 20157626.1, mailed on Jun. 12, 2020, 10 pages.
Extended European Search Report received for European Patent Application No. 20168112.9, mailed on Sep. 4, 2020, 9 pages.

(56) References Cited

OTHER PUBLICATIONS

International Preliminary Report on Patentability received for PCT Patent Application No. PCT/EP2019/056887, mailed on Oct. 8, 2020, 8 pages.
International Preliminary Report on Patentability received for PCT Patent Application No. PCT/EP2019/056888, mailed on Oct. 8, 2020, 8 pages.
International Preliminary Report on Patentability received for PCT Patent Application No. PCT/EP2021/053763, mailed on Aug. 23, 2022, 8 pages.
International Preliminary Report on Patentability received for PCT Patent Application No. PCT/EP2021/053764, mailed on Sep. 1, 2022, 9 pages.
International Preliminary Report on Patentability received for PCT Patent Application No. PCT/EP2021/058360, mailed on Aug. 11, 2022, 14 pages.
International Preliminary Report on Patentability received for PCT Patent Application No. PCT/EP2021/076482, mailed on Apr. 13, 2023, 12 pages.
International Preliminary Report on Patentability received for PCT Patent Application No. PCT/EP2021/083783, mailed on Jul. 13, 2023, 8 pages.
International Search Report and Written Opinion received for PCT Application No. PCT/EP2021/076482, mailed on Nov. 11, 2021, 18 pages.
International Search Report and Written Opinion received for PCT Patent Application No. PCT/EP2019/056887, mailed on Apr. 12, 2019, 10 pages.
International Search Report and Written Opinion received for PCT Patent Application No. PCT/EP2019/056888, mailed on Apr. 12, 2019, 10 pages.
International Search Report and Written Opinion received for PCT Patent Application No. PCT/EP2021/058360 mailed on Jun. 2, 2021, 12 pages.
International Search Report and Written Opinion received for PCT Patent Application No. PCT/EP2021/083783, mailed on Mar. 1, 2022, 12 pages.
International Search Report and Written Opinion received for PCT Patent Application No. PCT/EP2023/053486, mailed on Apr. 13, 2023, 13 pages.
International Search Report and Written Opinion received for PCT Patent Application No. PCT/EP2023/053489, mailed on Apr. 13, 2023, 13 pages.
International Search Report and Written Opinion received for PCT Patent Application No. PCT/EP2023/053493, mailed on Apr. 21, 2023, 13 pages.
International Search Report and Written Opinion received for PCT Patent Application No. PCT/EP2023/053494, mailed on Apr. 21, 2023, 13 pages.
Office Action and Search Report received for Chinese Patent Application No. 201980021010.4, mailed on Feb. 18, 2022, 11 pages (7 pages of English Translation and 4 pages of Official Copy).
Office Action received for Chinese Patent Application No. 201980021086.7, mailed on May 7, 2022, 8 pages (4 pages of English Translation and 4 pages of Official Copy).
Office Action received for European Patent Application No. 21824337.6, mailed on Jul. 1, 2024, 5 pages.
Search Report received for Great Britain Patent Application No. 2015374.8, mailed on Jun. 24, 2021, 4 pages.
Written Opinion of the International Preliminary Examining Authority received for PCT Patent Application No. PCT/EP2021/058360, mailed on Apr. 22, 2022, 7 pages.

Atwood, et al., "Fair Treatment Allocations in Social Networks", arXiv:1911.05489v1, Nov. 1, 2019, 11 pages.
Beyah, et al., "The Case for Collaborative Distributed Wireless Intrusion Detection Systems", Granular Computing, IEEE International Conference on Atlanta, 2006, pp. 782-787.
Bose, Abhijit, "Propagation, Detection and Containment of Mobile Malware", Computer Science and Engineering, 2008, 164 pages.
Del Rey, Angel Martin, "Mathematical Modeling of the Propagation of Malware: A Review", Security and Communication Networks, vol. 8, Jan. 28, 2015, pp. 2561-2579.
Eder-Neuhauser, et al., "Malware Propagation in Smart Grid Networks: Metrics, Simulation and Comparison of Three Malware Types", Journal of Computer Virology and Hacking Techniques, vol. 15, 2019, pp. 109-125.
Faghani, et al., "A Study of Trojan Propagation in Online Social Networks", 5th International Conference on New Technologies, Mobility and Security, 2012, 5 pages.
Feng, et al., "Dynamical Analysis and Control Strategies on Malware Propagation Model", Applied Mathematical Modelling, vol. 37, Apr. 3, 2013, pp. 8225-8236.
Guillen, et al., "A Mathematical Model for Malware Spread on WSNs with Population Dynamics", Physica A, vol. 545, 2020, pp. 1-11.
Guo, et al., "Impact of Network Structure on Malware Propagation: A Growth Curve Perspective", Journal of Management Information Systems, 2016, vol. 33, No. 1, 2016, pp. 296-325.
Hosseini, Soodeh, "Defense Against Malware Propagation in Complex Heterogeneous Networks", Cluster Computing, vol. 24, No. 2, 2021, pp. 1199-1215.
Khan, et al., "Cognitive Modeling of Polymorphic Malware using Fractal Based Semantic Characterization", IEEE International Symposium on Technologies for Homeland Security, 2017, 7 pages.
Liu, et al., "An Approach to Finding the Cost-effective Immunization Targets for Information Assurance", Decision Support Systems, vol. 67, 2014, pp. 40-52.
Matsubara, et al., "Nonlinear Dynamics of Information Diffusion in Social Networks", ACM Transactions on the Web, vol. 11, No. 2, Article 11, Apr. 2017, pp. 1-40.
Mieghem, Piet Van, "The Viral Conductance of a Network", Computer Communications, vol. 35, 2012, pp. 1494-1506.
Muchnik, et al., "Initial Growth Rates of Epidemics Fail to Predict their Reach: A Lesson from Large Scale Malware Spread Analysis", Scientific Reports, vol. 11, Aug. 2020, 15 pages.
Wright, Rob, "What is Polymorphic Virus?—Definition from WhatIs.com", Available Online at <https://web.archive.org/web/20211127061825/https://www.techtarget.com/searchsecurity/definition/polymorphic-malware>, 2021, 5 pages.
Xu, et al., "Analysis of Malware-Induced Cyber Attacks in Cyber-Physical Power Systems", IEEE Transactions on Circuits and Systems II, 2020, 5 pages.
International Preliminary Report on Patentability issued in PCT/EP2023/053486, Sep. 19, 2024, 9 pgs.
International Preliminary Report on Patentability issued in PCT/EP2023/053494, Sep. 19, 2024, 10 pgs.
International Preliminary Report on Patentability issued in PCT/EP2023/053489, Sep. 19, 2024, 9 pgs.
International Preliminary Report on Patentability issued in PCT/EP2023/053493, Sep. 19, 2024, 9 pgs.
Notice of Allowance issued in U.S. Appl. No. 17/904,467, filed Dec. 2, 2024, 13 pgs.
Non-Final Office Actoin issued in U.S. Appl. No. 18/247,121, filed Jan. 8, 2025, 33 pgs.

* cited by examiner

MALWARE PROPAGATION FORECASTING

PRIORITY CLAIM

The present application is a National Phase entry of PCT Application No. PCT/EP2021/053764, filed Feb. 16, 2021, which claims priority from EP patent application No. 20157627.9, filed Feb. 17, 2020, each of which is hereby fully incorporated herein by reference.

TECHNICAL FIELD

The present disclosure relates to the automatic forecasting of malware propagation across a set of computer systems.

BACKGROUND

Conventional malware protection mechanisms are reactive to the detection of malware in a network or the widespread distribution of anti-malware measures. Such approaches are known as "diagnosis and treatment". Similar techniques are used to combat the spread of biological infections. Mitigation measures such as anti-malware or malware-specific protective measures may not be known for some time after an infection has been studied for its effects. Further, the deployment of mitigation measures to an entire population of susceptible hosts in short order can be impractical.

SUMMARY

Accordingly, it is beneficial to provide improvements to the deployment of protections for malware for sets of computer systems.

According to a first aspect of the present disclosure, there is provided a computer implemented malware protection method to protect at least a subset of a set of computer systems from a malware, the method comprising: accessing a model of the set of computer systems, the model identifying interacting pairs of the computer systems in the set based on interactions corresponding to previous communication occurring between the computer systems in the pair; simulating, over a plurality of time periods, a propagation of the malware originating from a predetermined source computer system in the model, the simulation being based on a number of interactions per time period between each interacting pair of computer systems in the set, and a rate of transmission of the malware per interaction; responsive to the simulating, identifying one or more computer systems or interacting pairs of computer systems for the deployment of a malware protection measure thereto so as to inhibit a propagation of the malware through the set of computer systems.

In some embodiments, identifying one or more computer systems or interacting pairs of computer systems includes identifying a computer system or interacting pair through which the malware propagates to a subset of other computer systems in the set.

In some embodiments, identifying one or more computer systems or interacting pairs of computer systems includes identifying a subset of the set of computer systems having a greatest proportion of computer systems infected by the malware.

In some embodiments, malware protection measures include one or more of: an anti-malware facility; a malware filter; a malware detector; a block, preclusion or cessation of interaction; and a reconfiguration of one or more computer systems.

In some embodiments, the simulating is performed a plurality of times for the source computer system and the responsive to the simulating is responsive to the plurality of simulating.

In some embodiments, the simulating is performed a plurality of times for each of multiple different source computer systems, and the responsive to the simulating is responsive to the plurality of simulating.

In some embodiments, the number of interactions per time period between an interacting pair of computer systems is determined based on a statistical distribution such as a Poisson or uniform distribution.

In some embodiments, the number of interactions per time period between an interacting pair of computer systems in the set is defined based on historical records of interactions between the interacting pair of computer systems.

In some embodiments, the model further identifies a class of interaction between interacting pairs of computer systems, the class of interaction being determined based on historical records of interactions between each computer system in an interacting pair, and wherein the rate of transmission of the malware per interaction is determined for each interacting pair of computer systems based on the class of interaction for the interacting pair.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
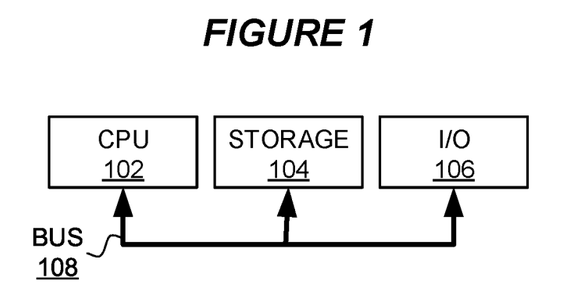
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. In some embodiments, a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system, and propagation of the malware to other computer systems.

The effects of malware on the operation and/or security of a computer system lead to a need to identify malware in a computer system in order to implement protective and/or remedial measures. While malware detection is often directed to computer systems themselves or the networks over which they communicate, embodiments of the present disclosure recognize that interactions between computer systems transcend the physical interconnections therebetween. In particular, embodiments of the present disclosure are directed to addressing interactions between computer systems that arise from communication between pairs of computer systems. Such interactions can include, for example, interactions between users of each of a pair of computer systems using, inter alia, social media, messaging, electronic mail or file sharing facilities. Thus, embodiments of the present disclosure employ a model of a set of computer systems in which interacting pairs of computer systems are identified, such interactions being based on previous communication occurring between the computer systems in the pair. Notably, such a model disregards intermediates in an interaction-such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like. Thus, a model of the physical communication becomes burdened by the intermediate features of a typical inter-computer communication. In contrast, embodiments of the present disclosure address the endpoints of an interaction such as the computer systems through which users communicate. A similar analysis can be conducted for interactions involving email, electronic messaging, file sharing and the like.

Embodiments of the present disclosure are directed to the deployment of malware protection measures so as to inhibit a propagation of a malware through a set of computer systems. In some embodiments, the deployment of malware protection measures is targeted to provide an effective and/or efficient inhibition of the propagation. The nature and type of malware protection measures themselves are understood by those skilled in the art and can include, inter alia: anti-malware facilities; malware filters; malware detectors; a block, preclusion or cessation of interaction and/or communication, such as between computer systems; and/or a reconfiguration of one or more computer systems or communications facilities therebetween.

Embodiments of the present disclosure identify computer systems or interacting pairs of computer systems for the deployment of malware protection measures based on a simulation of a propagation of malware through the model of a set of computer systems. Such simulation employs simulation parameters including: a rate of interaction between each interacting pair of computer systems (i.e. a number of interactions per time period); and a rate of transmission of the malware between interacting computer per interaction. In some embodiments, some or all of these parameters are derived statistically according to a statistical distribution. In some embodiments, some or all of these parameters are determined based on historical interaction information over a historical time period. In some embodiments, some or all of these parameters are determined based on one or more machine learning processes based on historical interaction information.

Figure 2:
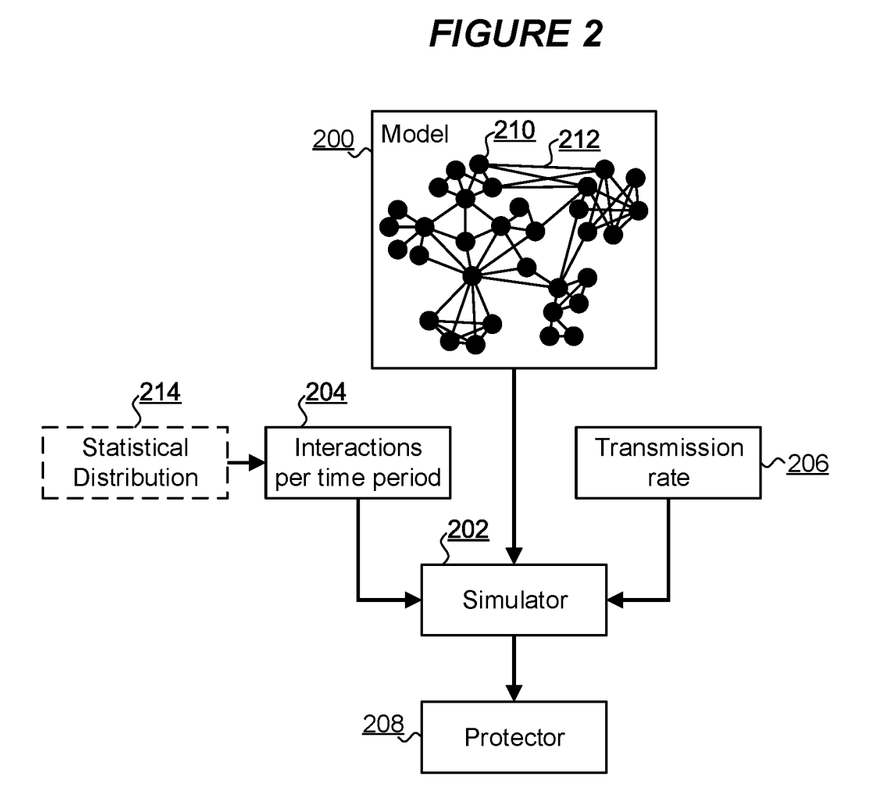
FIG. 2 is a component diagram of an arrangement for malware protection for at least a subset of a set of computer systems according to an embodiment of the present disclosure.

FIG. 2 is a component diagram of an arrangement for malware protection for at least a subset of a set of computer systems according to an embodiment of the present disclosure. A model 200 is provided as one or more data structures representing a set of computer systems and interactions therebetween. In some embodiments, the model 200 is provided as a graph or similar data structure including nodes or vertices 210, each corresponding to a computer system, and edges 212 each connecting a pair of nodes 210 and representing interaction between computer systems corresponding to each node 210 in the pair. Thus, an edge 212 represents interaction between a pair of computer systems. Each node 210 can have associated information for a corresponding computer system including, for example, inter alia: an identifier of the computer system; an identification of an organizational affiliation of the computer system; an identifier of a subnet to which the computer system is connected; and other information as will be apparent to those skilled in the art.

In some embodiments, an edge 212 constitutes an indication that at least one interaction has taken place over at least a predetermined historic time period between computer systems in a pair. In some embodiments, the existence of an edge 212 is not determinative, indicative or reflective of a degree, frequency or propensity of interaction between computer systems in a pair-rather, the edge 212 identifies that interaction has taken place. In some embodiments, edges 212 can have associated, for example, inter alia: an edge identifier; an identification of a pair of nodes 210 (and/or the corresponding computer systems) that the edge 212 interconnects; and/or interaction frequency information between a pair of computer systems. It will be appreciated by those skilled in the art that, while the model 200 is illustrated as a literal graph in the arrangement of FIG. 2, alternative data structures and logical representations of vertices and edges can be used, such as representations employing, for example, inter alia, vectors, arrays of vectors, matrices, compressed data structures and the like.

The arrangement of FIG. 2 includes a simulator 202 as a hardware, software, firmware or combination component arranged to perform a simulation of a propagation of a malware in the set of computer systems represented by the model 200. The simulator 202 is operable on the basis of simulation parameters including: an interaction rate 204 as a number of interactions between pairs of interacting computer systems in a time period; and a transmission rate 206 as a rate of transmission of a malware between computer systems in a pair of systems per interaction. In some embodiments, the transmission rate 206 is a probability of transmission of a malware from one node to another node during an interaction between the nodes 210. In some embodiments, the transmission rate 206 incorporates aspects of a malware infection process. For example, in the case of malware transmitted as a web-link between two computer systems by email, the transmission rate 206 can reflect all of: a probability that an email is communicated between the two computer systems; a probability that the email includes the malicious web-link; and a probability that a recipient accesses the malicious web-link resulting in malware infection.

In one embodiment, the interaction rate 204 is sampled from one or more statistical distributions 214 to model different types of interaction. For example, a Poisson or uniform distribution can be used to model a number of interactions between a pair of computer systems over a time period, such as a number of emails communicated over the time period. In one embodiment, the transmission rate 206 is initialized in advance, such as by a predetermined value. For example, a transmission rate 206 having a value of 0.0001 is indicative of a probability that a first computer system in an interacting pair of computer systems transmits a malware to a second computer system in the pair within a single predetermined time period is 0.0001. In one embodiment, the interaction rate 204 between each of an interacting pair of computer systems in the set of computer systems is defined based on historical records of interactions between the computer systems.

The simulator 202 can operate on the basis of configurable characteristics such as simulation assumptions. For example, the simulator 202 may operate on the basis that any computer system as represented by a node 210 in the model 200 can only transmit the malware to first-degree neighbors according to the model 200. Further, in some embodiments, the simulator 202 operates on the basis that each computer system has a state of infection at a point in time. States of infection at a point in time can include, for example: a state of susceptibility in which a computer system is susceptible to infection, such as a computer system that is not and has not been so far infected and is not specifically protected from infection by a particular malware; a state of infected in which a computer system is subject to infection by the malware at the point in time; and a state of removed or remediated in which a computer system is remediated of a past infection or protected from prospective infection by the malware. It will be appreciated by those skilled in the art that sub-states of these states can also be employed, such as, inter alia: an infected state that is not infectious (i.e. transmission of malware cannot be effected by a computer system in such a state); an infected state that is infectious; an infected state that is detected; and an infected state that is not detected (such as might be determined by the simulator 202).

Thus, in use, the simulator 202 is operable for a time period to model the propagation of a malware infection. In one embodiment, one or more predetermined source computer systems represented in the model 200 are selected as originating computer systems for the malware infection such that propagation is simulated from such originating computer systems. In some embodiments, the simulator 202 is executed for each of a plurality of time periods so as to model the propagation of the malware in the set of computer systems over time. Additionally or alternatively, the simulator 202 can be performed a plurality of times for each of a plurality of predetermined source computer systems selected as originating computer systems for the malware infection.

According to one embodiment, where the transmission rate 206 is denoted as p, and the interaction rate 204 is denoted as c, the simulator 202 can model propagation of a malware by formulating an infection probability of a susceptible computer system indicated as node i by its infected neighbors:

Considering $node_i$ where $i \in \{1, \ldots, n\}$ where n=number of nodes in the model, $node_i$'s infectious neighbors $Nhb_{i,j} = \{nhb_{i,1}, \ldots, nhb_{i,m^{(i)}}\}$ where $j \in \{1, \ldots, m^{(i)}\}$ and $m^i \in \mathbb{N}$ is the number of neighbors of $node_i$ The corresponding set of interactions are $Inter_{i,j} = \{c_{i,1}, \ldots, c_{i,m^{(i)}}\}$.

$$P(Nhb_i \text{ infects } node_i) =$$

$$P\left(nhb_{i,1} \text{ infects } node_i \text{ during any of their } c_{i,1} \text{ interactions}\right) =$$

$$1 - \prod_j P(nhb_{i,j} \text{ does not infect } node_i \text{ during an interaction})^{c_{i,j}} =$$

$$1 - \prod_j (1-p)^{c_{i,j}} = 1(1-p)^{\sum_{j=1}^{m^{(i)}} c_{i,j}}$$

Thus, an exemplary model for the simulator 202 to model transitions of nodes 210 from a state of susceptible to infected and from infected to removed (i.e. remediated) can be:

| | |
|---|---|
| Probability of a node transitioning from a susceptible state to an infected state | $1 - (1-p)^{\sum_{j=1}^{m^{(i)}} c_{i,j}}$ |
| Probability of a node in a susceptible state remaining in the susceptible state | $(1-p)^{\sum_{j=1}^{m^{(i)}} c_{i,j}}$ |

| | |
|---|---|
| Probability of a node transitioning from an infected state to a removed state | $\theta_r$ |
| Probability of a node in an infected state remaining in the infected state | $1 - \theta_r$ |
| Probability of a node in the removed state remaining in the removed state | 1 | where $\theta$ is a rate of removal/remediation.

Responsive to the simulation by the simulator 202, and, in particular, responsive to the model 200 of propagation of a malware determined by the simulator 202, a protector component 208 is operable to deploy malware protection measures intended to inhibit a propagation of the malware through the set of computer systems. The protector component 208 is a hardware, software, firmware or combination component arranged to access output from the simulator 202 such as one or more models, data structure representations, images, animations, visually renderable indications or other suitable representations of states of nodes corresponding to simulated states of computer systems in the set of computer systems. For example, a representation of states of computer systems can be provided based on the model 200 so as to indicate, for each computer system by way of a node 210 in the model 200, a state of the computer system (such as susceptible, infected, removed) over each of a plurality of time periods for which the simulator 202 was executed.

The protector 208 identifies one or more computer systems or interacting pairs of computer systems (such as are represented by edges 212 in the model 200) for the deployment of malware protection measures. Such identified systems or pairs of systems can be selected based on, for example, inter alia: a computer system or interacting pair of systems through which malware propagates in the simulation to a subset of other computer systems in the set of computer systems; identifying a subset of computer systems having a relatively greater, or greatest, proportion of computer systems infected by the malware according to the simulation, so as to identify one or more computer systems or pairs of systems as a gateway, link or bridge to such identified subset; a number of computer systems to which the malware is propagated via a computer system or pair of systems; and other criteria as will be apparent to those skilled in the art. For example, in one embodiment, "chokepoints" in the model 200 can be identified by the protector 208 based on the simulator 202 output as nodes 210 or pairs of nodes representing computer systems or interacting pairs of systems constituting pathways for propagation of the malware to subsets of nodes 210 in the model 200. The malware protection measures deployed by the protector 208 can include those previously described, and in this way at least a subset of the set of computer systems can be protected from the malware by the targeted deployment of malware protection measures.

In one embodiment of the present disclosure, the model 200 further identifies a class of interaction between interacting pairs of computer systems, such as an identification of a type of interaction that takes place between computer systems. For example, computer systems that typically interact by way of email can be classified differently to computer systems that typically interact by way of file-sharing, network drive sharing or the like. A class of interaction between computer systems can be determined based on historical records of interactions between each computer system in an interacting pair. In such embodiments, the rate of transmission 206 of the malware per interaction can be determined for each interacting pair of computer systems based on the class of interaction for the interacting pair so as to take account of the different types of interaction and a different propensity for malware propagation by each type.

Figure 3:
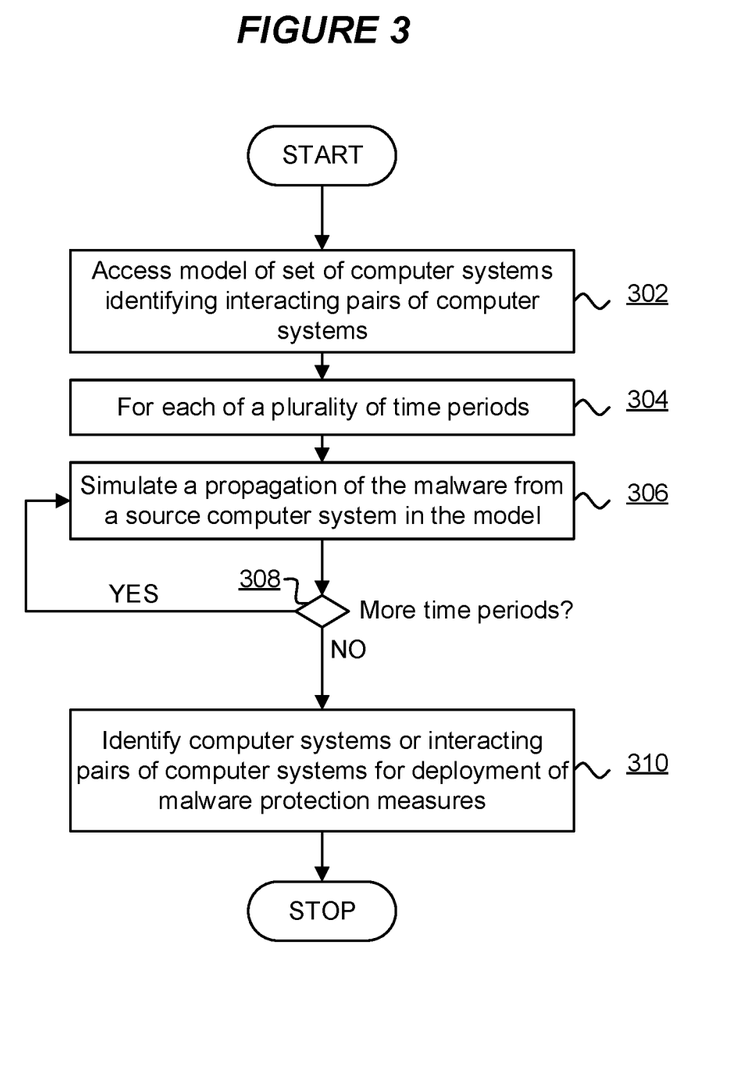
FIG. 3 is a flowchart of a malware protection method according to an embodiment of the present disclosure.

FIG. 3 is a flowchart of a malware protection method according to an embodiment of the present disclosure. Initially, at 302, the method accesses a model of a set of computer systems identifying interacting pairs of the computer systems based on interactions corresponding to previous communication occurring between the computer systems in the pair. At 304 the method commences an iteration between each of a plurality of time periods for simulation. At 306, for each simulated time period, the method simulates a propagation of a malware originating from a predetermined source computer system in the model. The simulation is based on a number of interactions per time period 204 between each interacting pair of computer systems in the set, and a rate of transmission 206 of the malware per interaction. The method loops through the time periods at 308. Subsequently, at 310 the method identifies one or more computer systems or interacting pairs of computer systems for the deployment of a malware protection measure to inhibit a propagation of the malware through the set of computer systems.

Figure 4:
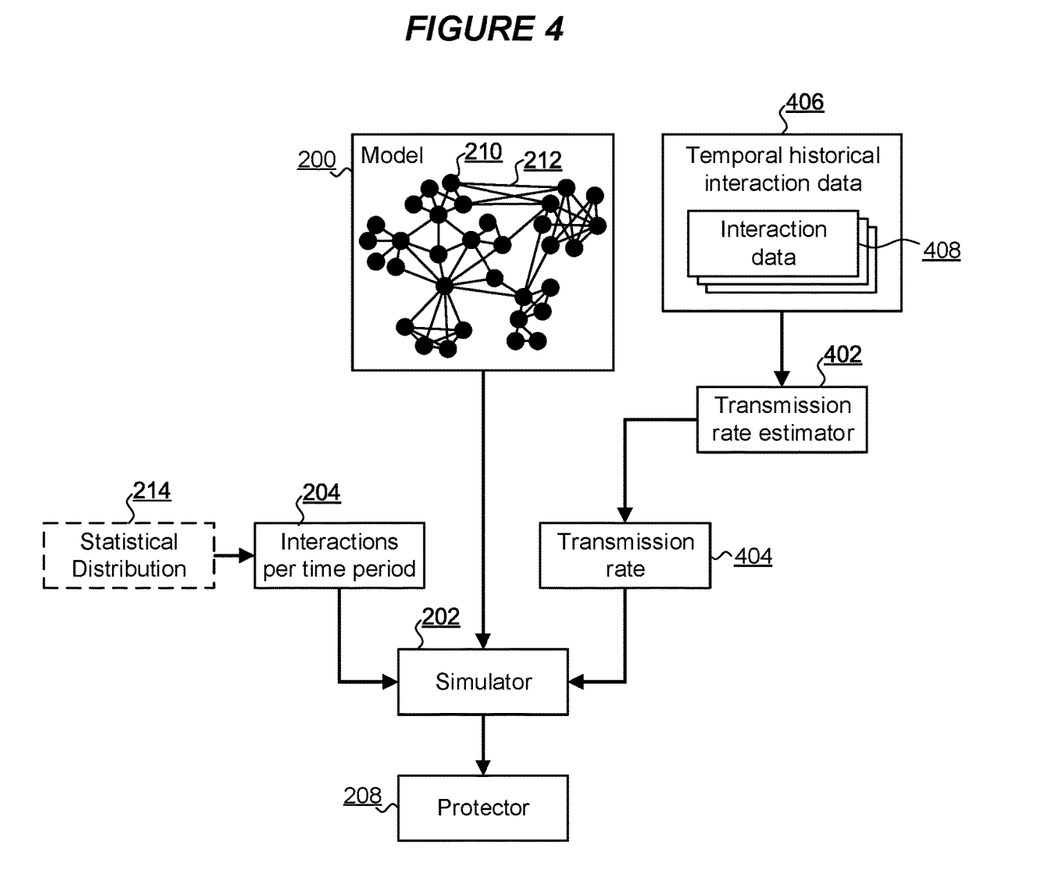
FIG. 4 is a component diagram of an arrangement for malware protection for at least a subset of a set of computer systems according to an embodiment of the present disclosure.

FIG. 4 is a component diagram of an arrangement for malware protection for at least a subset of a set of computer systems according to an embodiment of the present disclosure. Many of the elements of FIG. 4 are identical to those described above with respect to FIG. 2 and these will not be repeated here. The arrangement of FIG. 4 is operable during an infection, by a malware, of one or more computer systems in the set of computer systems and, accordingly, nodes 210 in the model 200 include indications of an infection state as, at least, susceptible or infected. Thus, the arrangement of FIG. 4 is operable during an infection such as in real-time while an infection is occurring in the set of computer systems.

According to the arrangement of FIG. 4, the transmission rate 404 is determined based on a set of temporal historical interaction data 406. The temporal historical interaction data 406 identifies interactions 408 between pairs of computer systems represented in the model 200 during each of a plurality of historical time periods—the time period being historical in that they occur prior to the operation of the simulator 202. A transmission rate estimator 402 is provided as a hardware, software, firmware or combination component for estimating a transmission rate 404 for input to the simulator 202 based on the temporal historical interaction data 406. In one embodiment, the transmission rate estimator 402 is operable to determine the rate of transmission 404 by modelling probabilities of transmission of the malware between interacting pairs of computer systems identified in the temporal historical interaction data.

In some embodiments, the transmission rate estimator 402 determines a maximum likelihood function for interactions occurring in each of a plurality of time periods for the historical interaction data 406 to determine an average probability of transmission of the malware between interacting pairs of computer systems. Additionally or alternatively, the probabilities of transmission can be modelled using a suitable statistical modelling function such as a Markov Chain Monte Carlo method for approximation of a probability as will be understood by those skilled in the art.

Accordingly, embodiments according to FIG. 4 employ interaction data 408 indicating actual frequencies of interactions between computer systems represented in the model 200. In some embodiments, such interaction data is directed such that, for a computer system (node 210 in the model 200), only incoming edges 212 (along which interactions are received) are considered prospective transmitters of malware. The interaction data 408 is temporal in that it is broken down into time periods in order that historic malware infection propagation can be modelled on a suitable time-based granularity (such as by minute, hour, day). In one embodiment, a number of interactions with a susceptible target (i.e. endpoint of an interaction) computer system from only infected source (i.e. originating) computer system are identified in the interaction data 408. By way of rationalizing interaction data 408, interactions between interacting pairs of computer systems can be represented as a summary or summation of total incoming interactions from infected neighbors per time period for input to the transmission rate estimator 402.

Figure 5:
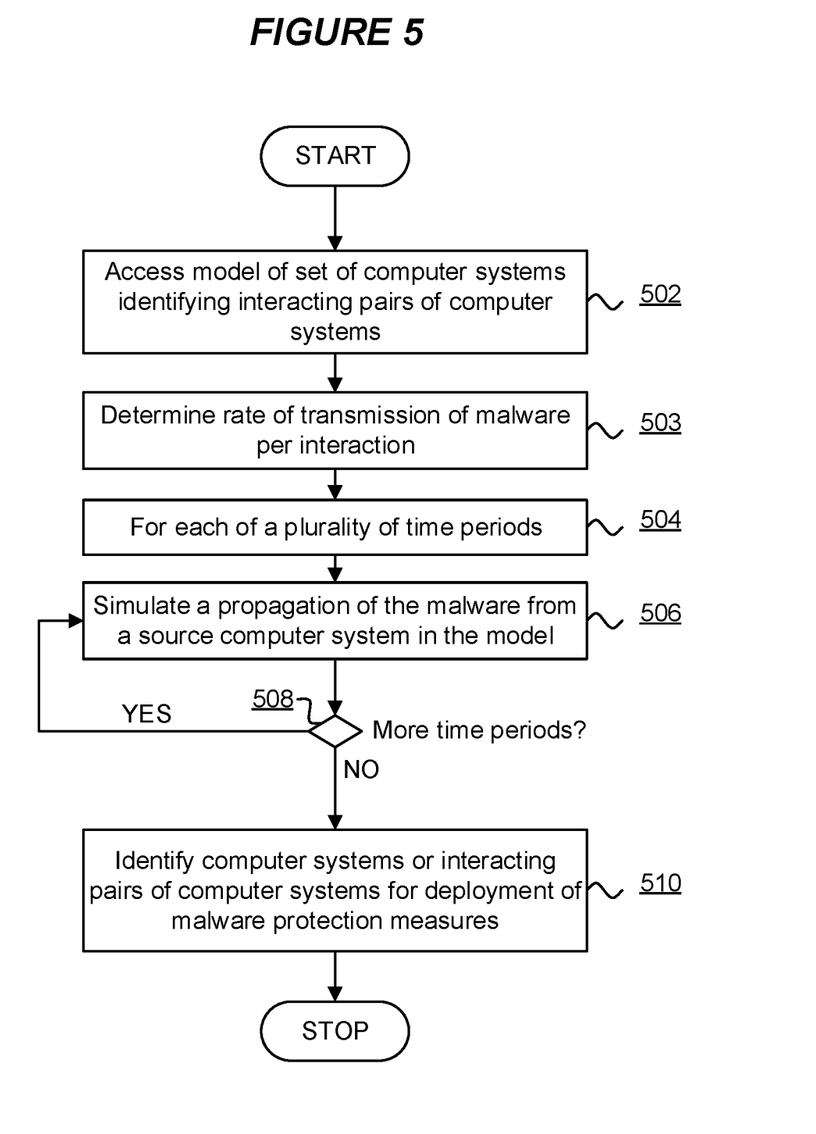
FIG. 5 is a flowchart of a malware protection method according to an embodiment of the present disclosure.

In one embodiment, the transmission rate estimator 402 determines a maximum likelihood function to estimate the transmission rate 404 according to a method such as:

Input:time: T
   list of vector of interactions: c
   number of nodes: n
   list of binary vectors length n,
     containing 1 for infected,
     containing 0 for susceptible nodes: y
Output: average infection transmission rate per interaction: p
For each time period in T:
   create vector of results
   For each susceptible node:
     sum all interactions c from infected nodes
     input summed interactions, binary vector y to maximum likelihood function
     apply log transformation to the maximum likelihood function minimize the log transformed function
     append result of minimization to vector of results return mean of vector of results FIG. 5 is a flowchart of a malware protection method according to an embodiment of the present disclosure. Many of the operations of FIG. 5 are identical to those described above with respect to FIG. 3 and these will not be repeated here. Additionally, FIG. 5 includes operation 503 according to which a rate of transmission of malware per interaction 404 is estimated by the transmission rate estimator 402 as described above.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented malware protection method to protect at least a subset of a set of computer systems from a malware, the method comprising:
   accessing a model of the set of computer systems, the model identifying interacting pairs of the computer systems in the set of computer systems based on interactions corresponding to previous communication occurring between the computer systems in the interacting pair;
   simulating, over a plurality of time periods, a propagation of the malware originating from a predetermined source computer system in the model, the simulating being based on a number of interactions per time period between each interacting pair of computer systems in the set of computer systems, and a rate of transmission of the malware per interaction; and
   responsive to the simulating, identifying one or more computer systems or interacting pairs of computer systems in the set of computer systems for deployment of a malware protection measure thereto so as to inhibit a propagation of the malware through the set of computer systems.

2. The method of claim 1, wherein identifying one or more computer systems or interacting pairs of computer systems includes identifying a computer system or an interacting pair through which the malware propagates to a subset of other computer systems in the set of computer systems.

3. The method of claim 1, wherein identifying one or more computer systems or interacting pairs of computer systems includes identifying a subset of the set of computer systems having a greatest proportion of computer systems infected by the malware.

4. The method of claim 1, wherein the malware protection measure includes one or more of: an anti-malware facility; a malware filter; a malware detector; a block, a preclusion or a cessation of interaction; and a reconfiguration of one or more computer systems.

5. The method of claim 1, wherein the simulating is performed a plurality of times for a source computer system and the identifying is responsive to the plurality of times of simulating.

6. The method of claim 1, wherein the simulating is performed a plurality of times for each of multiple different source computer systems, and identifying is responsive to the plurality of times of simulating.

7. The method of claim 1, wherein the number of interactions per time period between the interacting pair of computer systems is determined based on a statistical distribution.

8. The method of claim 1, wherein the number of interactions per time period between the interacting pair of computer systems in the set is defined based on historical records of interactions between the interacting pair of computer systems.

9. The method of claim 1, wherein the model further identifies a class of interaction between the interacting pairs of computer systems, the class of interaction being determined based on historical records of interactions between each computer system in an interacting pair, and wherein the rate of transmission of the malware per interaction is determined for each interacting pair of computer systems based on the class of interaction for the interacting pair.

10. A computer system comprising:
a processor and a memory storing computer program code for protecting at least a subset of a set of computer systems from a malware, by:
accessing a model of the set of computer systems, the model identifying interacting pairs of the computer systems in the set of computer systems based on interactions corresponding to previous communication occurring between the computer systems in the interacting pair,
simulating, over a plurality of time periods, a propagation of the malware originating from a predetermined source computer system in the model, the simulation being based on a number of interactions per time period between each interacting pair of computer systems in the set, and a rate of transmission of the malware per interaction, and
responsive to the simulating, identifying one or more computer systems or interacting pairs of computer systems for the deployment of a malware protection measure thereto so as to inhibit a propagation of the malware through the set of computer systems.

11. A non-transitory computer-readable storage element storing computer program code to, when loaded into a computer system and executed thereon, cause the computer system to carry out a method of protecting at least a subset of a set of computer systems from a malware by:
accessing a model of the set of computer systems, the model identifying interacting pairs of the computer systems in the set of computer systems based on interactions corresponding to previous communication occurring between the computer systems in the interacting pair;
simulating, over a plurality of time periods, a propagation of the malware originating from a predetermined source computer system in the model, the simulation being based on a number of interactions per time period between each interacting pair of computer systems in the set, and a rate of transmission of the malware per interaction; and
responsive to the simulating, identifying one or more computer systems or interacting pairs of computer systems for the deployment of a malware protection measure thereto so as to inhibit a propagation of the malware through the set of computer systems.

12. The method of claim 7, wherein the statistical distribution is a Poisson distribution or a uniform distribution.

* * * * *